Sept. 23, 1952 H. E. KOCH 2,611,790
ELECTRIC HEAT TREATING FURNACE
Filed May 24, 1949 10 Sheets-Sheet 1

FIG. 1

INVENTOR.
Harold E. Koch,
BY
John B. Brady
ATTORNEY

Sept. 23, 1952     H. E. KOCH     2,611,790
ELECTRIC HEAT TREATING FURNACE Filed May 24, 1949     10 Sheets-Sheet 4

INVENTOR.
Harold E. Koch,
BY
John B. Brady
ATTORNEY

Sept. 23, 1952            H. E. KOCH            2,611,790
ELECTRIC HEAT TREATING FURNACE
Filed May 24, 1949            10 Sheets-Sheet 5

INVENTOR.
Harold E. Koch,
BY John B. Brady
ATTORNEY

Sept. 23, 1952        H. E. KOCH        2,611,790
ELECTRIC HEAT TREATING FURNACE
Filed May 24, 1949        10 Sheets-Sheet 7

INVENTOR.
Harold E. Koch,
BY
John Q. Brady
ATTORNEY

Sept. 23, 1952  H. E. KOCH  2,611,790
ELECTRIC HEAT TREATING FURNACE
Filed May 24, 1949  10 Sheets-Sheet 8

INVENTOR.
Harold E. Koch,
BY John C. Brady
ATTORNEY

Sept. 23, 1952     H. E. KOCH     2,611,790
ELECTRIC HEAT TREATING FURNACE
Filed May 24, 1949     10 Sheets-Sheet 9

INVENTOR.
Harold E. Koch,
BY
John Q. Brady
ATTORNEY

Patented Sept. 23, 1952

2,611,790

UNITED STATES PATENT OFFICE 2,611,790

ELECTRIC HEAT TREATING FURNACE

Harold E. Koch, Pewaukee, Wis., assignor to Hevi Duty Electric Company, Milwaukee, Wis., a corporation of Wisconsin Application May 24, 1949, Serial No. 95,083

6 Claims. (Cl. 13—20)

My invention relates broadly to electric heat treating furnaces, and more particularly to a construction of composite convection heating, radiant heating, and cooling heat treating furnace.

One of the objects of my invention is to provide a construction of heat treating furnace having means for the precision control of temperature by one or more of the processes of convection, cooling, or radiant heating.

Another object of my invention is to provide a construction of furnace which may be used for either high temperature or low temperature heat treatment operations without the necessity of providing separate furnaces for carrying out these operations.

Still another object of my invention is to provide a construction of composite convection, cooling, and radiant heating furnace in which the elements for carrying out any one of the operative processes may be removed or replaced without disturbing or dismantling the remaining heating units.

Still another object of my invention is to provide a construction of composite convection, cooling, or radiant heating heat treating furnace having forced circulation means which may be operated with either convection or radiant units and not merely in connection with convection units only.

Still another object of my invention is to provide a construction of heat treating furnace in which heat losses are minimized by confining heat circulation due to convection to the furnace chamber as distinguished from furnaces which circulate air through chambers externally of the furnace.

Still another object of my invention is to provide a construction of heat treatment furnace employing cooling coils in place of or adjacent to the convection heat units to provide means for the rapid and precise cooling of the furnace chamber to effect rapid cooling of the work in specialized atmospheres.

Still another object of my invention is to provide a construction of convection, cooling, and radiant heating furnace which is equally adaptable to circular furnace structures and box type furnace structures for multiple purpose operation by convection, cooling, and radiant heat means.

A still further object of my invention is to provide means for electrically controlling the sequential operation of convection heaters, radiant heaters, forced circulation means, and cooling means within the same furnace chamber for re-circulation of air within the furnace chamber under conditions whereby accurate temperature conditions may be maintained.

Other and further objects of my invention reside in a compact construction of composite electric heat treatment furnace employing combinations of operations or individual operations embodying principles of convection, cooling, and/or radiant heating, as set forth more fully in the specification hereinafter following by reference to the accompanying drawings, in which:

Fig. 3 is a perspective view looking into the interior of the front of the furnace and showing particularly the location of the forced circulation means at the rear of the furnace chamber; Fig. 12 is a schematic wiring diagram showing the manner in which the convection heaters, the radiant heaters, and the air circulating fan may be independently controlled for securing accurate temperature control within the furnace chamber.

Previous practice in the art of heat treating made it necessary for a user to have two furnaces or other means available when he desired to treat metals at both high and low temperatures. This was due to the fact that furnaces designed for high temperature use were unsatisfactory at low temperatures because of the fact that radiant units tend to overheat work with thin sections which may be placed near the radiant units and the poor uniformity of temperature within the chamber. Obviously low temperature furnaces are not satisfactory for use at the higher temperatures. Some furnaces desired for certain processes have been designed for this type of application, but in one manner or other lack the essentials necessary for satisfactory operation.

One advantage of the furnace of my invention is that it can be used to operate either as a convection heating furnace or a radiant heating furnace with maximum efficiency and utility for either purpose. In use as a convection furnace the work is shielded from direct radiation from the heating elements. In use as a radiant type heating furnace, the work receives the benefit of radiant heating without the necessity of the operator making any mechanical change in the furnace.

Another advantage of the furnace of my invention is that the construction described is such that either convection or radiant elements can be removed or replaced without disturbing or dismantling the remaining heating units.

Another advantage of my invention is that an air circulating fan can be operated with either convection or radiant elements. This contrasts with other furnaces in which the fan can be operated with convection elements only.

Another advantage of my improved furnace is that five sided heat can be supplied for radiant heating.

Another advantage of the furnace of my invention when used as a convection furnace is that no great heat loss occurs while circulating the heated air as this is accomplished entirely within the furnace chamber, as contrasted to other furnaces which circulate air through a chamber outside of the furnace.

Another advantage of the furnace of my new construction is that the furnace may be provided with cooling coils in place of, or adjacent to the convection heating units to provide means of rapid cooling of the furnace chamber. This advantage is of particular benefit where processes are used requiring specialized atmospheres where air must be excluded from the furnace chamber and rapid cooling of the work is desired.

Thus I provide a compact unit which offers the operator the advantage of two types of furnaces in one compact unit.

Figure 1:
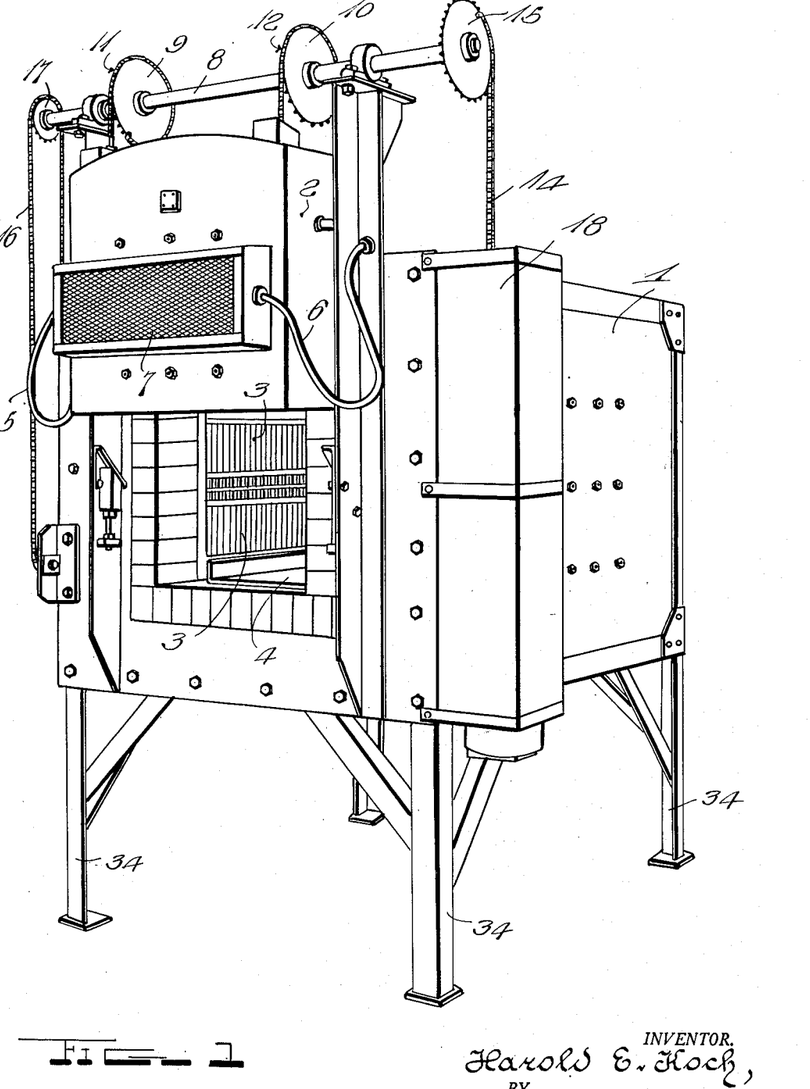
Figure 1 is a perspective view of an embodiment of a box type multiple purpose heat treatment electric furnace embodying my invention, the view being taken from a position adjacent the right of the front of the furnace.

Referring to the drawings in detail, Fig. 1 is a perspective view of a box type furnace which is illustrated at 1, and which embodies my invention, and which shows the vertically movable door closure 2 in open position in order to illustrate the radiant heaters 3 in the side walls of the furnace. The hearth plate is represented at 4 for receiving the work to be subjected to heat treatment. The convection heaters and the cooling means are not visible in Fig. 1, as these elements are located behind the radiant heaters indicated at 3. The vertically movable door closure 2 carries radiant heaters on the inside thereof, providing a fifth side of the furnace chamber which is positively heated. The circuit connections for the electric heaters in the interior surface of the vertically movable door closure 2 are completed through flexible cables 5 and 6, extending to terminals within terminal box 7, shown on the front of the closure. The closure operating means have been represented generally as controlled by transversely extending shaft 8, carrying sprocket wheels 9 and 10, over which sprocket chains 11 and 12 operate for suspending the closure 2. The counterbalance weight for control of shaft 8 is attached to sprocket chain 14, operative over sprocket wheel 15 carried by shaft 8. Manual control for manipulating the closure 2 has been represented by sprocket chain 16, operative over sprocket wheel 17 carried by shaft 8. Fig. 1 shows the counterbalance weight wholly within housing 18, with the closure 2 moved to open position.

Figure 2:
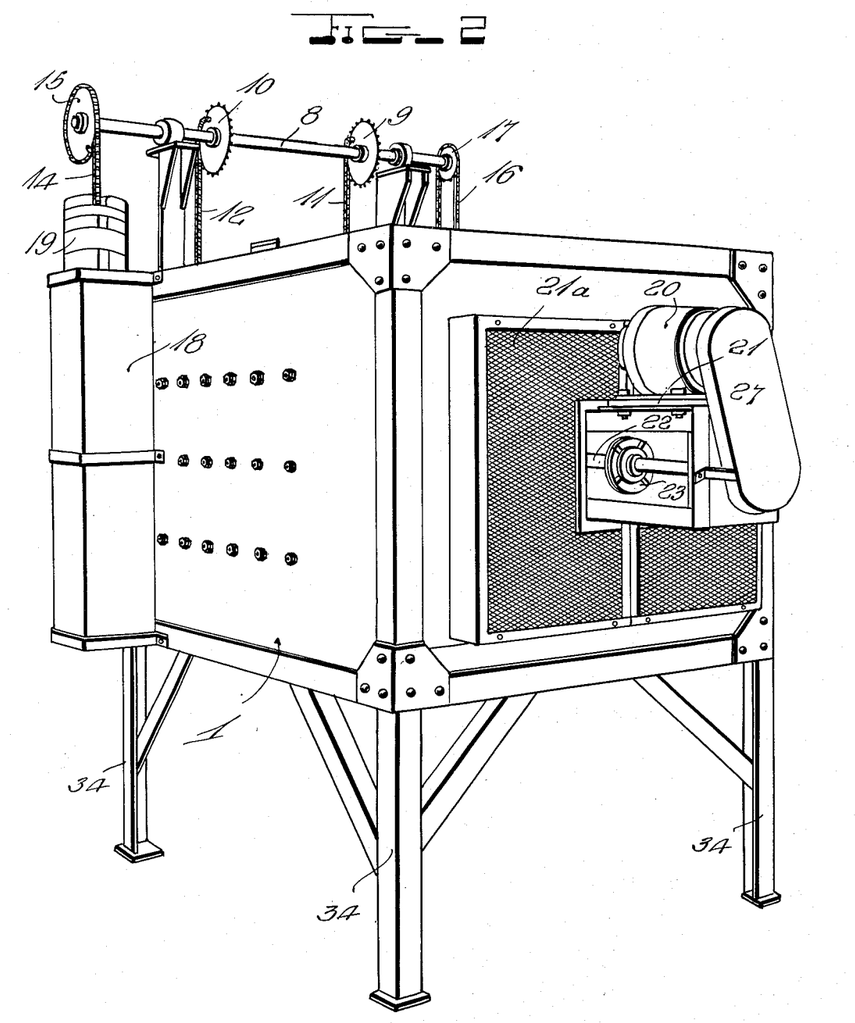
Fig. 2 is a rear perspective view of the heat treatment furnace shown in Fig. 1, the view being taken from the left rear of the furnace.

In Fig. 2, the rear of the furnace illustrated in Fig. 1 has been shown where the closure has been moved to closed position and wherein counterweight 19 has now been raised from housing 18. Similarly, sprocket chains 11 and 12 have unwound from sprocket wheels 9 and 10 under control of manipulation of sprocket chain 16. The rear of the furnace shows the driving motor 20 supported on supporting frame 21, which extends rearwardly of the furnace. The shaft for driving the air circulating fan has been illustrated as projecting from the rear of the furnace chamber at 22, and supported in bearings at 23 and 24 (Fig. 4) and connected to a driven pulley 25 which is driven by belt 26 from the motor 20. As illustrated in Fig. 2, a belt guard or housing 27 is provided over the belt 26. The temperatures existent at the position of emergence of shaft 22 from the furnace chamber are very high, and to facilitate cooling of the shaft 22 an auxiliary fan 28 is mounted on shaft 22 adjacent its position of emergence from the furnace chamber. The air circulating fan which is driven by shaft 22 is shown at 29 for effecting the forced circulation of air in the furnace chamber through the fan guard represented at 30.

Referring further to Fig. 2, the rear of the furnace is provided with a protective guard and housing 21a, within which there is located the terminal connections for the cables leading to the convection heaters and the radiant heaters, and also the manifold connections to the ends of the cooling pipes.

In Fig. 3 I have shown more particularly the arrangement of the fan guard 30 interiorly of the furnace chamber and in front of the air circulating fan 29. The fan guard 30 is formed from heat resistant material acting as a fan inlet directing the flow of air into the fan. In Fig. 3 I have shown the radiant heaters 3 in the side walls of the furnace, as well as the radiant heaters 31 in the roof of the furnace chamber. The convection heaters and cooling coils are not visible in Fig. 3, as these elements are located behind the radiant heaters.

Figure 4:
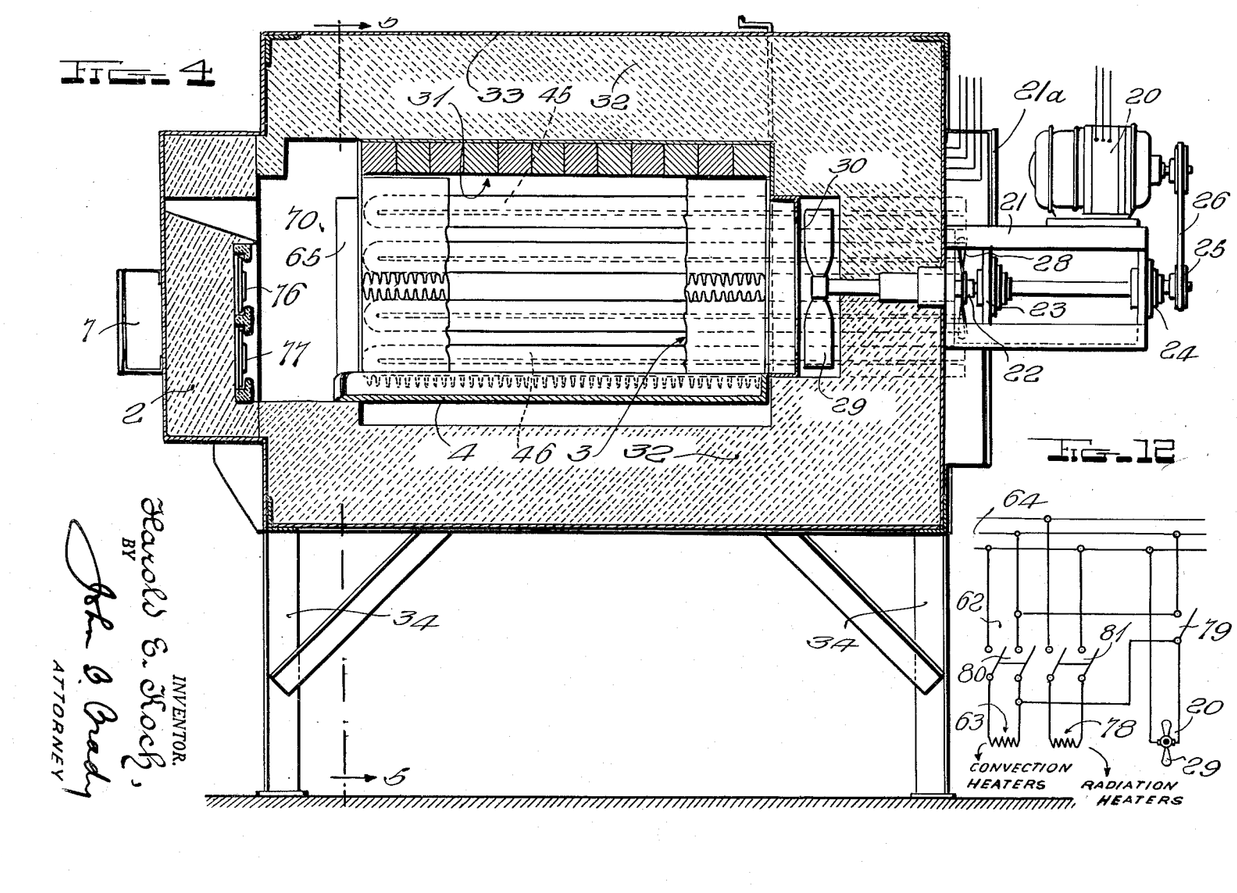
Fig. 4 is a longitudinal sectional view taken through the furnace of Figs. 1–3, with the radiant heating means partially broken away to illustrate the convection heating means and the cooling ducts provided in the walls of the furnace, and illustrating particularly the air circulating fan for effecting forced circulation within the furnace chamber.

The furnace is constructed of the conventional insulation material involving brick and slab insulation indicated generally at 32 in Fig. 4, with the surrounding metallic shell indicated generally at 33 erected on suitable structural supports designated at 34. Within the brick and slab insulation 32 I provide longitudinally extending recesses or pockets 35, 36, 37 and 38, arranged in the side walls and behind the recesses or pockets 39, 40, 41 and 42, also arranged in the side walls. The pockets or recesses 35, 36, 37 and 38 receive the enclosed coils or ducts 43, 44, 45 and 46 for the circulation of the cooling media. This cooling media may be air, gas or liquid, depending upon the particular application involved.

Figure 5:
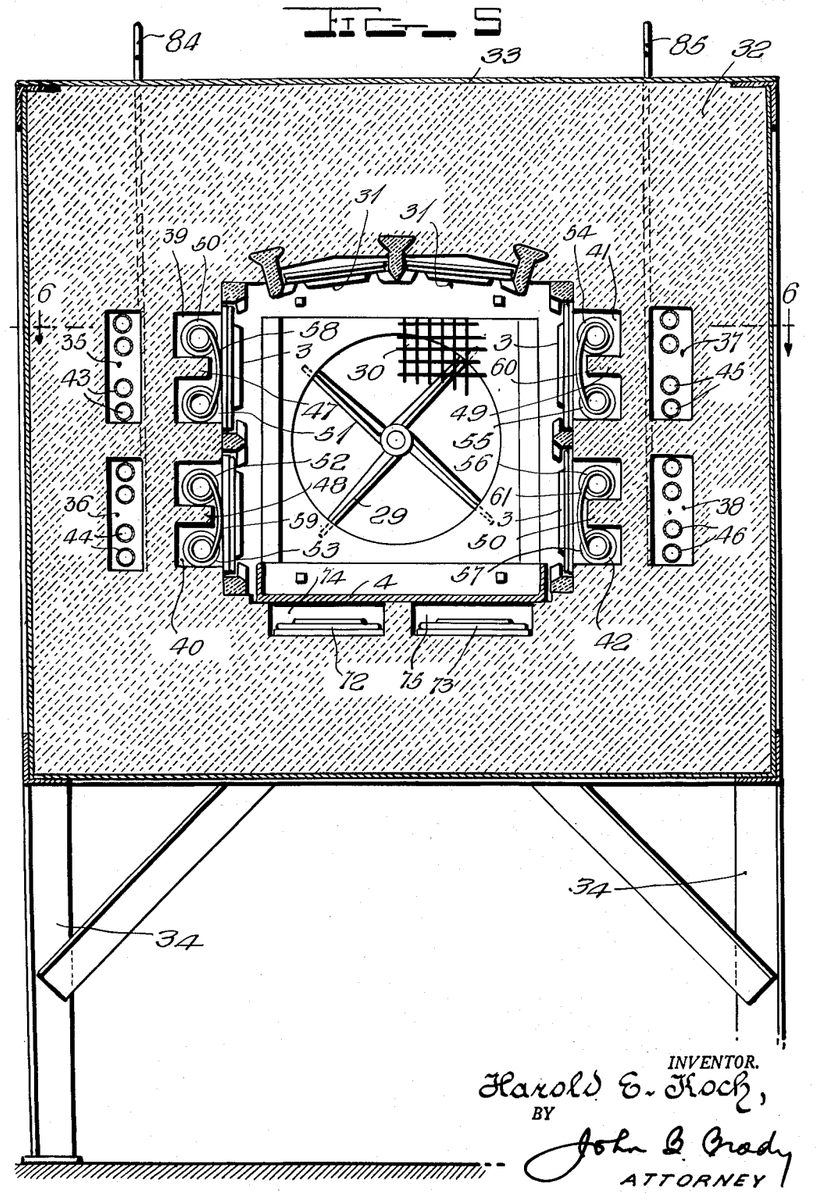
Fig. 5 is a transverse sectional view taken through the furnace of Fig. 4, substantially on line 5—5 thereof.

The recesses or pockets 39, 40, 41 and 42 each include a refractory supporting ledge or shelf therein, designated respectively at 47, 48, 49 and 50. These supporting ledges or shelves provide mounting means for the tubular refractories which I have designated in rows 50, 51, 52, 53, 54, 55, 56 and 57. The heating coils represented at 58, 59, 60 and 61 are mounted in the refractories and electrically connected to the heater control circuit 62 represented in Fig. 12 whereby the convection heaters are energized for the convection heater control of the furnace. In Fig. 12 the multiplicity of convection heaters illustrated and described in Fig. 5 have been designated generally as a load at 63 for receiving power from the power system 64. The rows of tubular refractories are each formed by aligned cylindrical sections perforated or slotted transversely along the length thereof to allow rapid circulation of the air or other media within the chamber. Recesses at the ends of the several pockets or longitudinally extending recesses thus described, terminate in transversely extending passages shown more clearly in Fig. 6 at 65, 66, 67 and 68. The passages 66 and 68 open into the fan housing chamber 69 at the rear of the structure wherein is mounted the motor driven fan 29. The front ends of the passages 65 and 67 open directly behind the vestibule 70 of the furnace chamber 71. The openings are the full height of the chamber and of sufficient width to allow free circulation of air or other furnace atmosphere.

The radiant heaters and refractories are mounted adjacent to the recessed openings containing the convection heating elements and refractories, thus forming the fourth side of the convection heating duct, and the interior wall of the furnace providing for radiant heating. The radiant heaters beneath hearth 4 are designated at 72 and 73, disposed in longitudinally extending recesses 74 and 75 respectively. As heretofore explained, the radiant heaters in the side walls are designated at 3 and the radiant heaters in the ceiling structure are represented at 31. The closure 2 is provided with radiant heaters 76 and 77 in the rear thereof. These heating elements form part of the radiant heating circuit which I have designated as embracing all of the radiant heaters as represented at 78 in Fig. 12.

Figure 6:
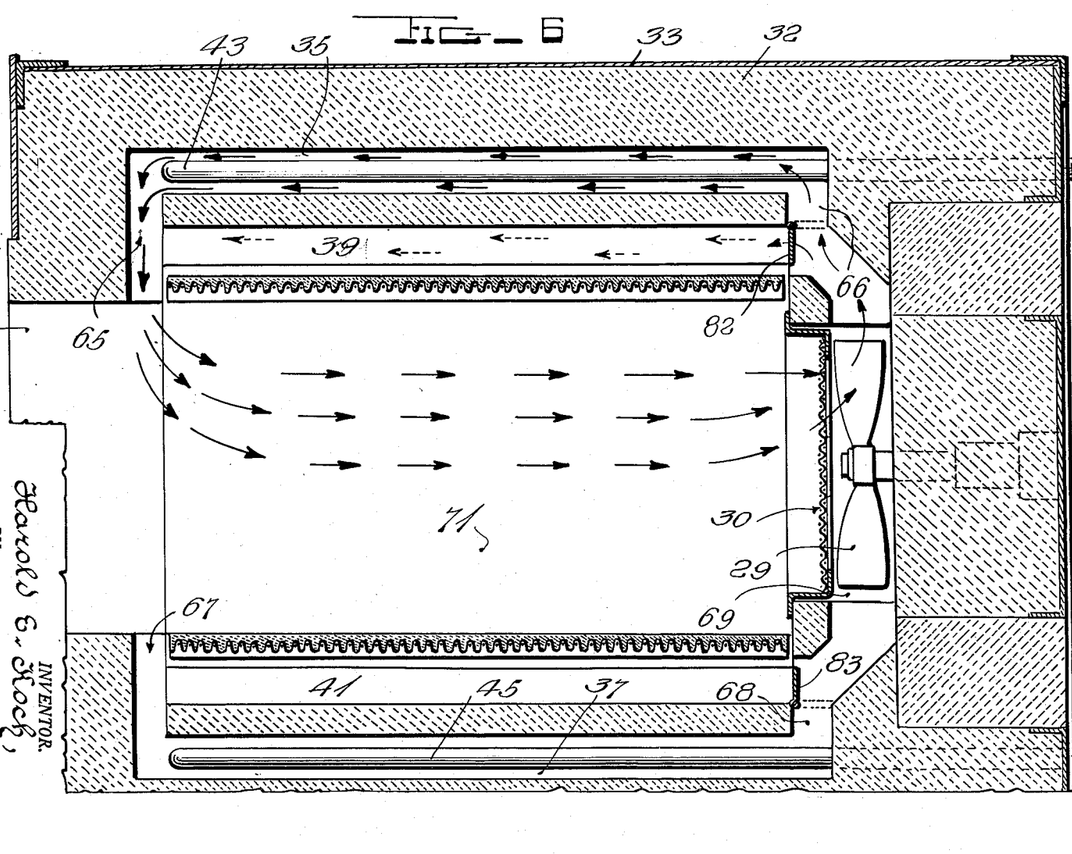
Fig. 6 is a horizontal sectional view through the composite convection, cooling, and radiant type furnace, the view being taken substantially on line 6—6 of Fig. 5.

The rear wall of the furnace structure is constructed so that sections may be removed, as clearly shown in block arrangement in Fig. 6, for easy removal and replacement of convection heating units or cooling coils or ducts. The rear ends of the cooling coils 43, 44, 45 and 46 are all accessible from the rear of the furnace chamber at 22, and may be coupled through suitable manifolds for series or parallel feed.

In the typical schematic wiring diagram of Fig. 12, I have shown the manner in which the centrifugal fan 29 is driven by motor 20 electrically connected through switch 79 for closing the circuit from the power source 64 to the driving motor 20. Switches are provided at 80 and 81 between the power supply source leads 64 and the sets of convection heaters 63 and the sets of radiant heaters 78 respectively. These switches may be independently and selectively operated for energizing either the convection heaters 63 or the radiant heaters 78. Precision control of the circulating media is obtained by means of externally controllable dampers which I have designated at 82 and 83 in passages 67 and 68 respectively. The external controls for these dampers are represented at 84 and 85 in Fig. 5.

When using the furnace for convection heating, only the spiral convection units are energized, thus providing a heating source in the recessed chambers. This heated air is then forced through the recesses into the furnace chamber through the openings at the front side wall, wherein it flows around the work and back through the fan housing, where it starts to repeat the process.

When using the furnace for radiant heating the convection units are de-energized and the radiant units energized to provide radiant heat to the work in the furnace chamber. The fan may or may not be used during this radiant heating cycle.

When rapid cooling of the furnace chamber is desired, a cooling media is circulated in the coils or ducts and the fan unit in the furnace used to transfer the cooled air or atmosphere to the work.

One method of operation is for the operator to bring the furnace up to the high temperature required to do the preliminary heat treating operation, such as hardening, after which the material is removed from the furnace and the furnace cooled down to the lower temperatures at which the operator may wish to do a tempering operation. This is accomplished by deenergizing the radiant heating units, starting the fan or leaving it running as the case may be, and then, when the furnace has dropped to the required temperature energizing the convection heating units and using the furnace for convection heating at low temperatures. When using a furnace constructed with cooling ducts, the operator may leave his work in the furnace and reduce temperatures by use of the apparatus provided for cooling.

Figure 7:
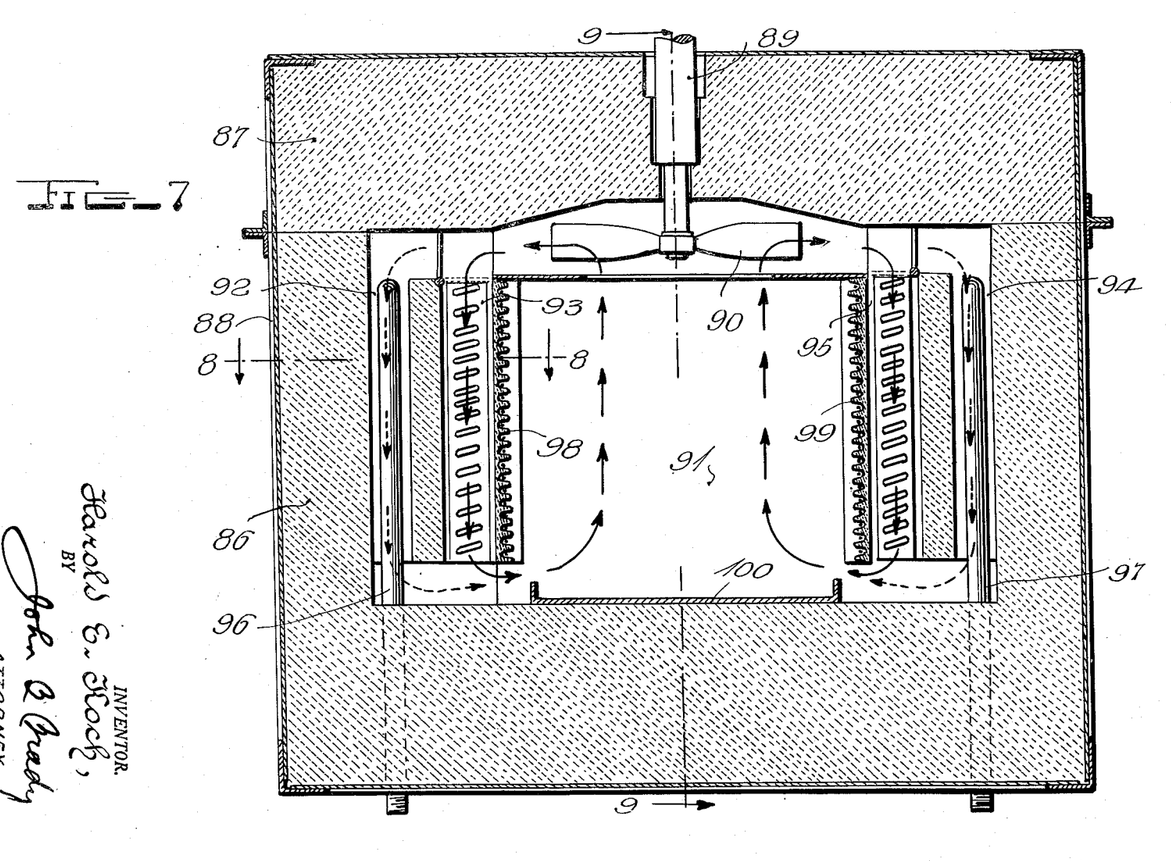
Fig. 7 is a cross sectional view through a modified form of composite convection, cooling, and radiant heat furnace, in which the air circulating fan is located in the top of the furnace chamber instead of at the end thereof, and wherein the convection, cooling, and radiant heat units are ranged in multiple sections.
Figure 8:
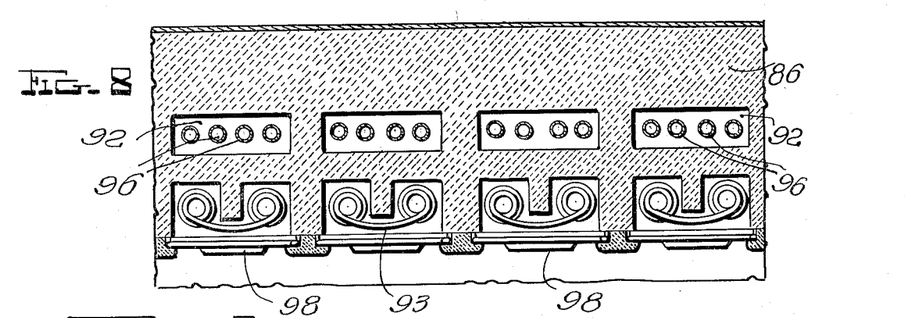
Fig. 8 is a fragmentary horizontal sectional view taken on line 8—8 of Fig. 7 through the wall of the furnace, and showing the composite means for controlling temperature by convection, cooling, and by radiant heat.
Figure 9:
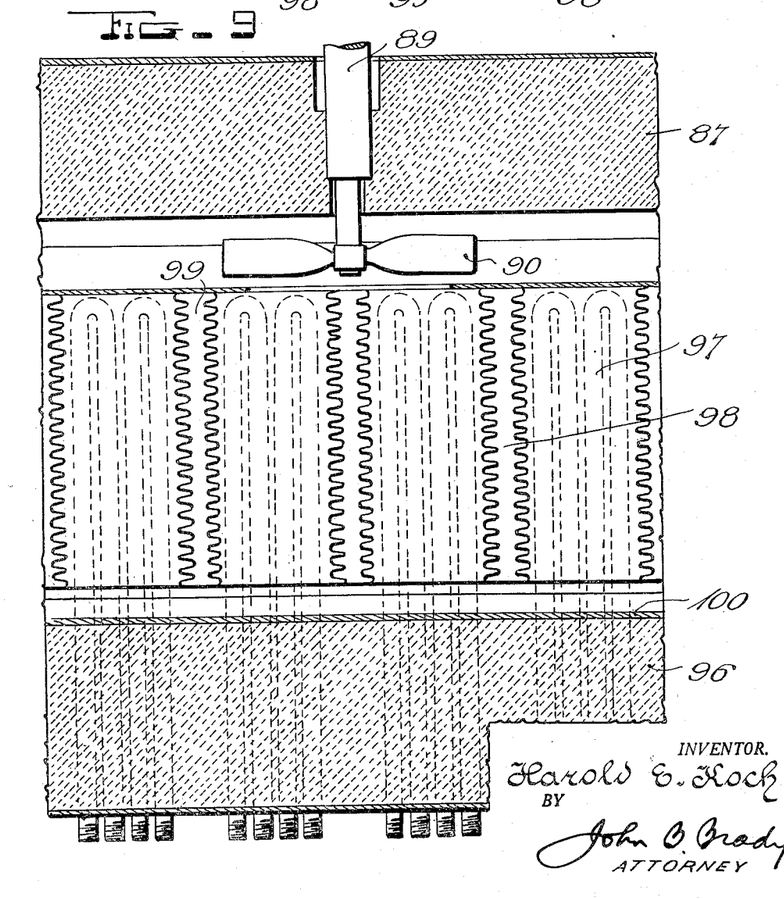
Fig. 9 is a vertical sectional view taken substantially on line 9—9 of Fig. 7, and illustrating the relation of the air circulating fan with respect to the convection, cooling, and radiant heat means in the furnace.

The unique features of construction illustrated in the box type furnace shown in Figs. 1-6 with the air circulating fan arranged in the rear of the furnace chamber, are readily embodied in a multiple section box type furnace having an air circulating fan at the top of the furnace chamber, as illustrated in Figs. 7-9. The principles embodied in the structure shown in Figs. 7-9 are the same as those set forth in Figs. 1-6, although the arrangement differs. In Figs. 7-9 the brick and slab insulation structure of the furnace is illustrated at 86 aligned with an upper section 87 of insulation material. The furnace shell is represented at 88. The fan driving shaft 89 extends through the upper section 87 for driving air circulating fan 90, which is arranged in a substantially horizontal plane for circulating air through the furnace chamber 91. The side walls of the furnace structure are provided with separate passageways represented at 92 and 93 at one side, and at 94 and 95 at the opposite side. The passageway 92 provides space for the cooling coils or ducts 96, while the passageway 94 provides space for the cooling coils or ducts 97. The passages 93 and 95 provide mounting means for the convection heaters shown more clearly in Fig. 8. In front of the convection heaters, which are similar in construction to those described in the form of my invention illustrated in Figs. 1–6, I provide radiant heaters mounted on refractories, as represented at 98 and 99. The hearth in the construction illustrated in Figs. 7–9 is represented at 100. In the vertical sectional view shown in Fig. 9 I have illustrated the refractories supporting the radiant heaters in elevation, with the convection heaters located behind the radiant heaters, and with the cooling means located behind the convection heaters, similar to the arrangement explained in Figs. 1–6.

Figure 10:
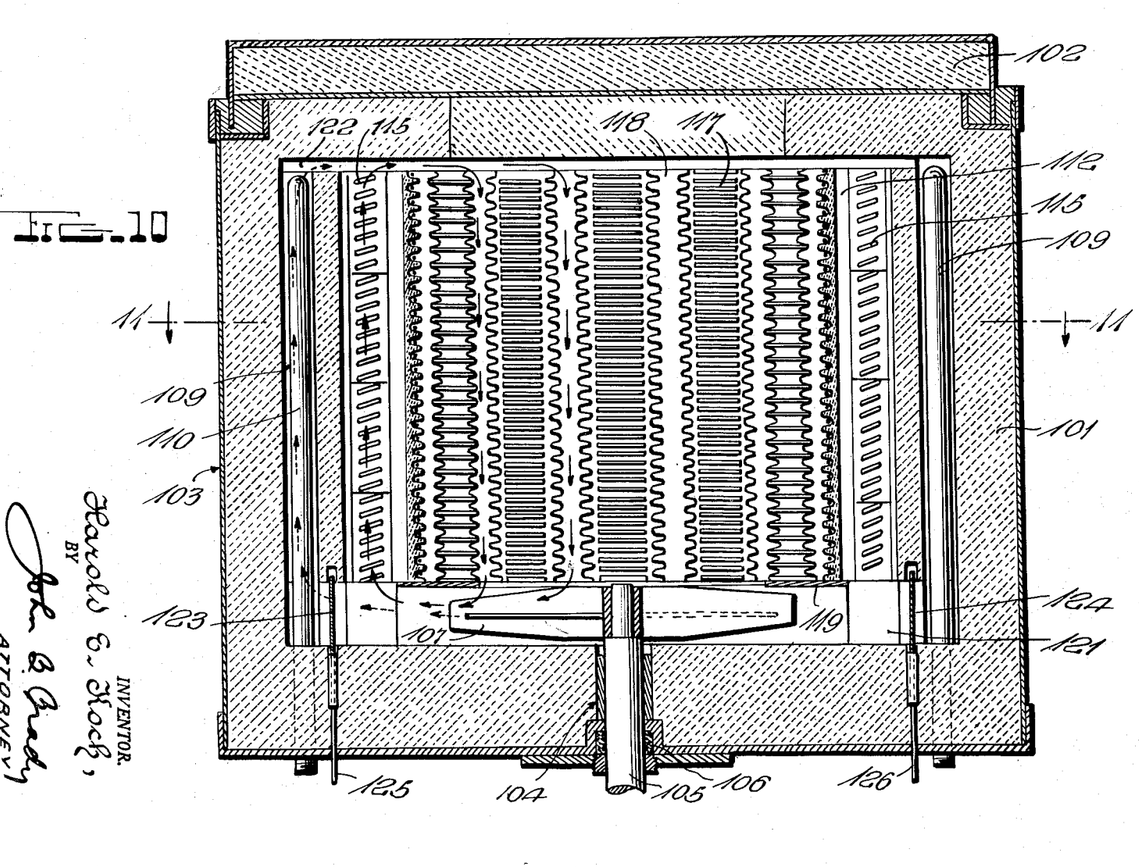
Fig. 10 is a vertical sectional view taken through a circular construction of furnace embodying a composite arrangement of convection, cooling, and radiant heating means in accordance with my invention, and illustrating the air circulating fan adjacent the base of the furnace.
Figure 11:
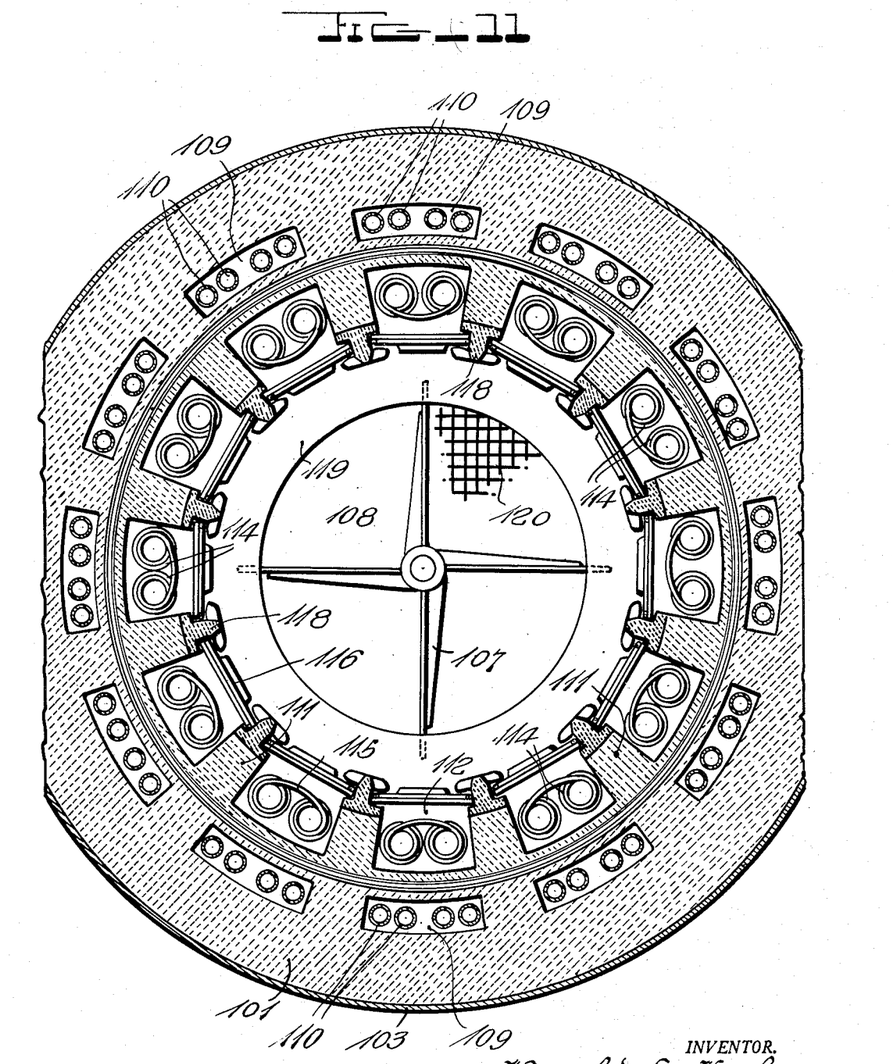
Fig. 11 is a horizontal sectional view through the circular type furnace of my invention taken substantially on line 11—11 of Fig. 10.

In Figs. 10–11 I have shown my invention applied to a circular type furnace having a lower refractory portion 101, and a cover portion 102. The furnace shell is represented at 103. The bottom of the furnace structure has a central aperture 104 therein, through which fan drive shaft 105 extends, with appropriate heat insulation packing 106 applied adjacent thereto. The air circulating fan operates in a substantially horizontal plane as represented at 107. A central, substantially cylindrical furnace chamber is located directly over fan 107, as represented generally at 108. The refractory wall 101 of the furnace is provided with vertically extending passages 109, arranged in the form of sectors substantially around the circular wall of insulation, as shown more particularly in Fig. 11. Within these passages I arrange sets of cooling coils which I have represented at 110. Within the refractory wall structure of the furnace there is an inner wall section of refractory material, represented at 111, and within this wall structure I provide vertically extending passages 112, which are radially aligned with the passages 109. The passages 112 provide mounting means for the refractory tubular sections 114, which serve to mount the convection heating coils 115. The convection heating coils 115 are directly behind the refractories 116, which support the radiant heaters represented at 117 in Fig. 10. There are vertically extending refractory members 118, which serve to retain the refractories which support the radiant heaters in position. A work supporting plate forms a ledge 119 extending partially into the chamber 108, with respect to which heat resistant wire guard 120 is mounted. A horizontally extending passageway is provided at 121, interconnecting the lower ends of the vertically extending passages 109 and 112. The upper ends of these passages are interconnected through a horizontally extending passage 122. Dampers are provided as represented at 123 and 124, externally actuated as represented at 125 and 126 for controlling the circulation of the air and furnace atmosphere, as represented by the lines of arrows.

Thus the work within furnace chamber 108 may be subjected to radiant heating, convection heating, or cooling, under control of an electric circuit system similar to that illustrated in Fig. 12.

I have found the composite heating and cooling system of my invention highly practical and successful in operation, and while I have described my invention in certain preferred embodiments, I realize that modifications may readily occur and I desire that it be understood that no limitations upon my invention are indicated other than may be imposed by the scope of the appended claims.

What I claim as new and desire to secure by Letters Patent of the United States is as follows:

1. A heat treating furnace comprising a housing of heat insulation material, a furnace chamber within said housing, a plurality of transversely aligned spaced recesses formed in said heat insulation material, a plurality of temperature control means arranged in the recesses in said housing, said temperature control means comprising successively arranged radiant heating means and convection heating means, and a cooling means associated with both of said means, said means being aligned transversely with each other within the spaced recesses in said housing on opposite sides of said chamber, said radiant heating means being disposed in a recess in said heat insulation material immediately adjacent the furnace chamber, and the convection heating means being disposed in recesses intermediate said radiant heating means and said cooling means.

2. A heat treating furnace comprising a housing of heat insulation material, a furnace chamber within said housing, a multiplicity of ducts spaced one from another on different levels and extending longitudinally through said housing and transversely aligned with each other and with said furnace chamber, cooling coils arranged in certain of said ducts, convection heating coils in others of said ducts and radiant heaters disposed adjacent said convection heating coils and adjacent said furnace chamber, a fan circulator mounted adjacent said furnace chamber for circulating a confined atmosphere within said chamber around said ducts and in contacting relation with said cooling coils, said convection heaters and said radiant heaters, and selective means for electrically energizing said convection heating coils, said radiant heaters and said fan circulator for compositely controlling temperature conditions within the furnace chamber.

3. A heat treating furnace comprising a housing of heat insulation material, a furnace chamber within said housing, a multiplicity of spaced ducts extending longitudinally through said housing in transverse alignment with each other and with said furnace chamber, cooling coils disposed in certain of said ducts and having their turns disposed in spaced relation to the sides of the said ducts, convection heating coils disposed in certain of the others of said ducts in transverse alignment with the turns of said cooling coils and radiant heaters in the sides of said furnace chamber and disposed at one side of the ducts which enclose said convection heating coils and in transverse alignment with the turns of said cooling coils and with said convection heating coils, valve members disposed adjacent the common ends of the ducts in which said cooling coils and said convection heating coils are located, said valve members being movable to either of two positions, in one position of which the ducts which enclose the convection heating coils are cut off and recirculation of atmosphere through the furnace chamber is confined to a path around the turns of the cooling coils and across said radiant heaters, and in the other position of which the recirculation of atmosphere through the furnace chamber is confined to a path through the ducts enclosing the convection heating coils and across said radiant heaters, and means for controlling the composite effects upon a charge in said furnace chamber by said cooling coils, said convection heating coils and said radiant heaters.

4. A heat treating furnace comprising a housing of heat insulation material, a furnace chamber within said housing, a multiplicity of spaced ducts extending longitudinally through said housing in transverse alignment with each other and with said furnace chamber, cooling coils disposed in certain of said ducts and having their turns disposed in spaced relation to the sides of the said ducts, convection heating coils disposed in certain of the others of said ducts in transverse alignment with the turns of said cooling coils and radiant heaters in the sides of said furnace chamber and disposed at one side of the ducts which enclose said convection heating coils and in transverse alignment with the turns of said cooling coils and with said convection heating coils, means for confining the recirculation of atmosphere through the furnace chamber selectively in a path across said radiant heaters and through the ducts enclosing said cooling coils or across said radiant heaters and the ducts enclosing said convection heating coils, and means for controlling the composite effects upon a charge in said furnace chamber by said cooling coils, said convection heating coils and said radiant heaters.

5. A heat treating furnace comprising a housing of heat insulation material, a furnace chamber within said housing, a multiplicity of spaced ducts extending longitudinally through said housing in transverse alignment with each other and with said furnace chamber, cooling coils disposed in certain of said ducts and having their turns disposed in spaced relation to the sides of the said ducts, horizontally arranged refractory tubes disposed in certain of the others of said ducts in transverse alignment with the turns of said cooling coils, convection heating coils carried by said refractory tubes and radiant heaters disposed in the sides of said furnace chamber, said refractory tubes having hollow centers through which a force flow of atmosphere is effected through a recirculation of the atmosphere through the furnace chamber, and means for controlling composite effects upon a charge in said furnace chamber by said cooling coils, said convection heating coils and said radiant heaters.

6. A heat treating furnace comprising a housing of heat insulation material, a furnace chamber within said housing, a multiplicity of spaced ducts extending longitudinally through said housing in transverse alignment with each other and with said furnace chamber, cooling coils disposed in certain of said ducts and having their turns disposed in spaced relation to the sides of the said ducts, convection heating coils disposed in certain of the others of said ducts in transverse alignment with the turns of said cooling coils and radiant heaters in the sides of said furnace chamber and disposed at one side of the ducts which enclose said convection heating coils and in transverse alignment with the turns of said cooling coils and with said convection heating coils, said transverse alignment of said cooling coils, said convection heating coils, and said radiant heaters being disposed in radial paths for completing a circular enclosure formed by said housing, and means for controlling the composite effects upon a charge in said furnace chamber by said cooling coils, said convection heating coils and said radiant heaters.

HAROLD E. KOCH.

REFERENCES CITED

The following references are of record in the file of this patent:

UNITED STATES PATENTS

| Number | Name | Date |
|---|---|---|
| 1,164,187 | Hovland | Dec. 14, 1915 |
| 1,295,309 | Harbeck et al. | Feb. 25, 1919 |
| 1,691,259 | Tamele | Nov. 13, 1928 |
| 1,707,300 | Diederichs | Apr. 2, 1929 |
| 1,938,306 | Webb | Dec. 5, 1933 |
| 2,214,582 | Hansen | Sept. 10, 1940 |
| 2,228,088 | Roth | Jan. 7, 1941 |
| 2,320,172 | Brooke et al. | May 25, 1943 |
| 2,472,497 | Stookey | June 7, 1949 |

FOREIGN PATENTS

| Number | Country | Date |
|---|---|---|
| 653,930 | France | Nov. 20, 1928 |